(12) United States Patent
Takechi et al.

(10) Patent No.: US 7,146,498 B1
(45) Date of Patent: Dec. 5, 2006

(54) COMPUTER AND PROGRAM RECORDING MEDIUM

(75) Inventors: Hideaki Takechi, Toyonaka (JP); Masazumi Yamada, Moriguchi (JP); Hiroyuki Iitsuka, Katano (JP); Takuya Nishimura, Osaka (JP); Yoshiki Kuno, Moriguchi (JP); Shoichi Gotoh, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,422

(22) PCT Filed: Feb. 21, 2000

(86) PCT No.: PCT/JP00/00956

§ 371 (c)(1),
(2), (4) Date: Dec. 7, 2000

(87) PCT Pub. No.: WO00/50989

PCT Pub. Date: Aug. 31, 2000

(30) Foreign Application Priority Data

Feb. 22, 1999 (JP) .............................. H11-043870

(51) Int. Cl.
*H04L 9/00* (2006.01)
*H04K 1/00* (2006.01)

(52) U.S. Cl. ........................ 713/158; 713/176; 713/194

(58) Field of Classification Search ................ 713/2, 713/165, 176, 175, 155, 190, 193, 295, 158, 713/194; 709/229, 217; 380/255, 283, 242, 380/28; 382/100; 705/52, 59, 54; 763/29; 725/29

See application file for complete search history.

(56) References Cited

U.S. PATENT DOCUMENTS

| 4,558,176 | A | * | 12/1985 | Arnold et al. ............... 713/190 |
| 4,704,725 | A | * | 11/1987 | Harvey et al. ............... 380/242 |
| 5,371,794 | A | | 12/1994 | Diffie et al. |
| 5,787,172 | A | * | 7/1998 | Arnold ........................ 713/175 |
| 5,870,467 | A | | 2/1999 | Imai et al. |
| 6,069,647 | A | * | 5/2000 | Sullivan et al. ................ 725/29 |
| 6,149,522 | A | * | 11/2000 | Alcorn et al. ................. 463/29 |

(Continued)

FOREIGN PATENT DOCUMENTS

| JP | 7-193569 | 7/1995 |
| JP | 8-87440 | 4/1996 |

(Continued)

OTHER PUBLICATIONS

Office Action of JP Application No. 11-43870 dated Jan. 25, 2005 (w/partial English translation).

(Continued)

*Primary Examiner*—Christopher Revak
(74) *Attorney, Agent, or Firm*—RatnerPrestia (57) ABSTRACT

The problem to be solved is that once copyright claimed AV data is passed to application software, the application software can freely process the AV data for recording, etc., defeating the purpose of copyright protection. The invention provides a computer which comprises a system section 12 and an application software section 13, and which takes in copyright claimed, encrypted data via a digital interface 1 for processing therein, wherein the system section 12 judges that the application software section 13 is legitimate application software for the protection of copyright, and if the application software is a legitimate one, the system section 12 passes a key for the encrypted data to the application software section 13.

13 Claims, 7 Drawing Sheets

U.S. PATENT DOCUMENTS

| | | | | |
|---|---|---|---|---|
| 6,240,530 | B1 * | 5/2001 | Togawa | 714/38 |
| 6,523,113 | B1 * | 2/2003 | Wehrenberg | 713/176 |
| 6,912,512 | B1 * | 6/2005 | Miyazaki et al. | 705/51 |

FOREIGN PATENT DOCUMENTS

| | | |
|---|---|---|
| JP | 8-137686 | 5/1996 |
| JP | 10-301492 | 11/1998 |
| JP | 11-507160 | 6/1999 |
| WO | WO 98/44402 | 10/1998 |

OTHER PUBLICATIONS

Nikkei Electronics, No. 706, Jan. 5, 1998 (Tokyo), David Aucsmith, p. 209-220.

Nikkei Electronics, No. 696, Aug. 18, 1997 (Tokyo), p. 110-119.

The Institut of Image Information and Television Engineers, technical report, vol. 21, No. 31, May 22, 1997 (Tokyo), Natsume Matsuzaki, Hideshi Ishihara, Takahisa Hukushima, p. 15-19.

National Technical Report, vol. 43, No. 3, Jun. 18, 1997 (Tokyo), Natsume Matsuzaki, Makoto Tatebayashi, Hideshi Ishihara, Takahisa Hukushima, p. 118-122.

National Technical Report, vol. 43, No. 3, Jun. 18, 1997, (Tokyo), Masakazu Matsuyama, Takatoshi Matsui, Yukio Matsuura, Eiki Takahashi, p. 31-35.

English translation of International Search Report for PCT/JP00/00956 dated Mar. 31, 2000.

* cited by examiner

| COPYRIGHT OF AV DATA | LICENSE OF APPLICATION SOFTWARE | AUTHENTICATION |
|---|---|---|
| COPY PROHIBITED | A | SUCCEED |
| COPY PROHIBITED | B | FAIL |
| COPY PROHIBITED | C | SUCCEED |
| COPY PERMITTED ONLY ONCE | A | SUCCEED |
| COPY PERMITTED ONLY ONCE | B | FAIL |
| COPY PERMITTED ONLY ONCE | C | SUCCEED |
| NO MORE COPIES PERMITTED | A | SUCCEED |
| NO MORE COPIES PERMITTED | B | FAIL |
| NO MORE COPIES PERMITTED | C | SUCCEED |

COMPUTER AND PROGRAM RECORDING MEDIUM

THIS APPLICATION IS A U.S. NATIONAL PHASE APPLICATION OF PCT INTERNATIONAL APPLICATION PCT/JP00/00956.

TECHNICAL FIELD

The present invention relates to a computer for recording and reproducing data, and also relates to a program recording medium.

BACKGROUND ART

Networks for transmitting audio and video information in digital form are being developed. To transmit audio or video information for viewing or listening, the data must be transmitted in real time.

IEEE 1394 was proposed as a standard for networks realizing such realtime data transmission, and is widely used today. IEEE 1394 is mounted as an external interface in many digital video/audio apparatuses including home digital VCRs. In VCRs, the use of IEEE 1394 has made it possible to control the VCR from an external device and also to transmit data from an external device to the VCR for recording or reproduction.

In PCs, on the other hand, with advances in multimedia technology and the advent of recording media such as large-capacity hard disks and magneto-optical disks, it has become possible to process video and audio information as well. That is, PCs can now have the capability to function as a recording and reproduction apparatus or a monitor for video and audio information. Windows 98, the standard OS for PCs, for example, supports IEEE 1394, making it possible to transfer AV data between PCs and digital video/audio apparatuses such as VCRs. It is expected that the fusion between PCs and digital video/audio apparatuses will further advance in the future.

For a PC to be able to handle video and audio information, application software for processing video and audio information must be installed on the PC. AV data transferred from a video/audio apparatus is input into the PC, and processed for display, recording, reproduction, etc. by the application software installed on the PC. For example, if the application software is one that has a recording function, the AV data transferred from the video/audio apparatus is input into the PC, and recorded on a recording medium such as a hard disk or a magneto-optical disk by the application software. Application software capable of processing AV data thus provides a variety of capabilities and, by installing such application software, a variety of AV data processing functions such as recording, reproduction, display, and manipulation can be added to the PC.

Some AV data claim copyright protection, for example, by prohibiting copying or by permitting copying only once. In digital video/audio apparatuses such as VCRs, such copyright claimed AV data is recorded or played back by respecting the claimed copyright protection status. For example, for AV data for which copying is prohibited, VCRs do not record the data. On the other hand, for AV data for which copying is permitted only once, VCRs are allowed to record the data. Whether copying of AV data is permitted or not is confirmed by exchanging authentication or usage approval information based on copyright between the VCR and the AV data transmitting apparatus such as an STB (satellite broadcast receiver).

In today's PCs, however, if one wishes to respect the claimed copyright of copyright claimed AV data, since a variety of functions, such as recording, reproduction, and display, can be incorporated into a PC by utilizing the functions of the application software installed on the PC, there arises the problem that once the copyright claimed AV data is passed to the application software, one can freely process the AV data for recording, etc. by using the application software, defeating the purpose of the copyright protection.

Even if a mechanism is devised to append a license for processing copyright claimed AV data to application software, the copyright may not be able to be protected if the application software is illegally modified. In that case, if a tamper resistant system is built into the application software to prevent illegal modification of the application software, the copyright can be protected effectively. However, this method is not without problems; that is, once the tamper resistant system is broken by an illegal-minded user, substantial changes would have to be made not only to the organization of the PC but also to the structures of the OS, the application software, etc. resulting in a large loss.

Furthermore, if copyright claimed data is illegally handled using application software to which a license as described above is not granted, it is not possible to identify the source application software from the data that was illegally copied by the application software and distributed. That is, even if the presence of illegal application software is known, it is not possible to detect and disable the use of the illegal application software. That is, the problem is that it is not possible to identify and eliminate illegal software for copyright protection purposes.

One characteristic of illegal usage by software is that the method of illegal usage can be distributed widely at low cost by just copying the software. This leads to the problem that even if the source of the illegal distribution can be identified, it is not effective to employ a method applied in the case of hardware that disables the use by illegal apparatuses on an apparatus by apparatus basis. For example, when copies of an illegally altered application capable of escaping the check by a tamper resistant system are distributed, or when a method of escaping the check by a tamper resistant system is discovered and distributed, with the prior known method of disabling the use for each individual computer it is not possible to prevent such illegal act; besides, it could disable the use of legitimate applications.

In view of the above situation, it is apparent that once an illegal distribution by a computer modified for the purpose of illegal distribution is discovered, since measures have to be taken to prohibit the use of AV data on computers or on the OS and to modify the computers or the OS itself, the damage is extensive and the cost involved is very high.

As described above, the problem is that there are no effective ways to prevent illegal use once copyright claimed data is illegally distributed.

DISCLOSURE OF THE INVENTION

In view of the problems that application software can perform processing that infringes copyright on copyright claimed data, defeating the purpose of copyright protection, that it is practiced to defeat copyright protection by illegally modifying application software, that if illegal application software is produced, it is not possible to identify and disable the illegal software to protect the copyright, that if copies of an illegally altered application capable of escaping the check by a tamper resistant system are distributed, with the prior known method it is not possible to prevent illegal use, and that when an illegal distribution by a computer modified for the purpose of illegal distribution is discovered, the cost of countermeasures is very high, it is an object of the present invention to provide a computer and a program recording medium that can protect the copyright for copyright claimed data and take countermeasures against illegal modifications of application software, and that, if illegal application is discovered, can identify and reject the application software and prevent an illegal distribution without involving extra cost.

To solve the problems described above, one aspect of the present invention is a computer which comprises a system section and an application software section, and which takes in copyright claimed, encrypted data via a digital interface for processing therein, wherein said system section judges that said application software section is legitimate application software for the protection of copyright, and if said application software is a legitimate one, said system section passes a key for said encrypted data to said application software section.

Another aspect of the present invention is a computer, wherein said judgement in said system section is made by performing authentication between said system section and said application software section.

Still another aspect of the present invention is a computer, wherein said judgement in said system section is made by using a CRL (Certification Revocation List) listing illegitimate or legitimate application software.

Yet another aspect of the present invention is a computer, wherein said system section obtains said encrypted key as the result of authentication with an external device, decrypts said encrypted data, and re-encrypts said decrypted data by using said key or another key.

Still yet another aspect of the present invention is a computer, wherein said system section includes a tamper verification function, and a tamper code is embedded into said application software in said application software section, and wherein said system section reads said tamper code from said application software section and, using said tamper verification function, verifies whether or not said application software has been tampered with, and if it is found that said application software has been tampered with, said system section reports the result of said verification.

Another aspect of the present invention is a computer which comprises a system section and an application software section, and which takes in copyright claimed, encrypted data via a digital interface for processing therein, wherein said system section includes a plurality of tamper verification functions, and a tamper code associated with a designated type of tamper verification function and type information indicating said type are embedded into said application software in said application software section, and wherein said system section reads said tamper code and its associated type information from said application software section and, using the tamper verification function corresponding to said type, verifies whether or not said application software has been tampered with, and if it is found that said application software has been tampered with, said systems reports the result of said verification.

A still further aspect of the present invention is a computer which comprises a system section and an application software section, and which takes in copyright claimed, encrypted data via a digital interface for processing therein, wherein said system section sends said data to said application section by embedding into said data information concerning application software residing in said application software section.

A yet further aspect of the present invention is a computer according to said $7^{th}$ invention, wherein the information concerning said application software is information indicating the name of said application software, or the version number of said application software, or a tamper code, or the type of a tamper resistance verification function, or information concerning user.

A still yet further aspect of the present invention is a medium holding thereon a program and/or data for enabling a computer to implement all or part of the functions of all or part of the means of the invention described in any one of said $1^{st}$ to $8^{th}$ inventions, wherein said medium is computer processable.

An additional aspect of the present invention is a collection of information wherein said collection of information is a program and/or data for enabling a computer to implement all or part of the functions of all or part of the means of the invention.

DESCRIPTION OF THE REFERENCE NUMERALS 1. 1394 D-IF
2. TRANSMISSION AUTHENTICATION MEANS
3. APPLICATION AUTHENTICATION FUNCTION
4. SIGNATURE MEMORY
5. DATA PATH
6. TRANSMISSION DECRYPTION MEANS
7. INTRA-PC ENCRYPTION MEANS
8. APPLICATION AUTHENTICATION MEANS
9. SIGNATURE CREATING MEANS
10. DATA USE (DECODE DISPLAY) MEANS
11. DECRYPTION MEANS
12. SYSTEM SECTION

13. APPLICATION SOFTWARE SECTION
14. CRL MEMORY
15. APPLICATION CRL MEMORY
16. CRL COMPARING MEANS
17. TAMPER AUTHENTICATION FUNCTION
18, 19. SOFT CHECK MEANS
20. VERSION SELECTING MEANS
21. TAMPER AUTHENTICATION FUNCTION
22. SIGNATURE EMBEDDING MEANS
23. ELECTRONIC WATERMARK EMBEDDING MEANS

BEST MODE FOR CARRYING OUT THE INVENTION

Embodiments of the present invention will be described below with reference to drawings.

Embodiment 1

Figure 1:
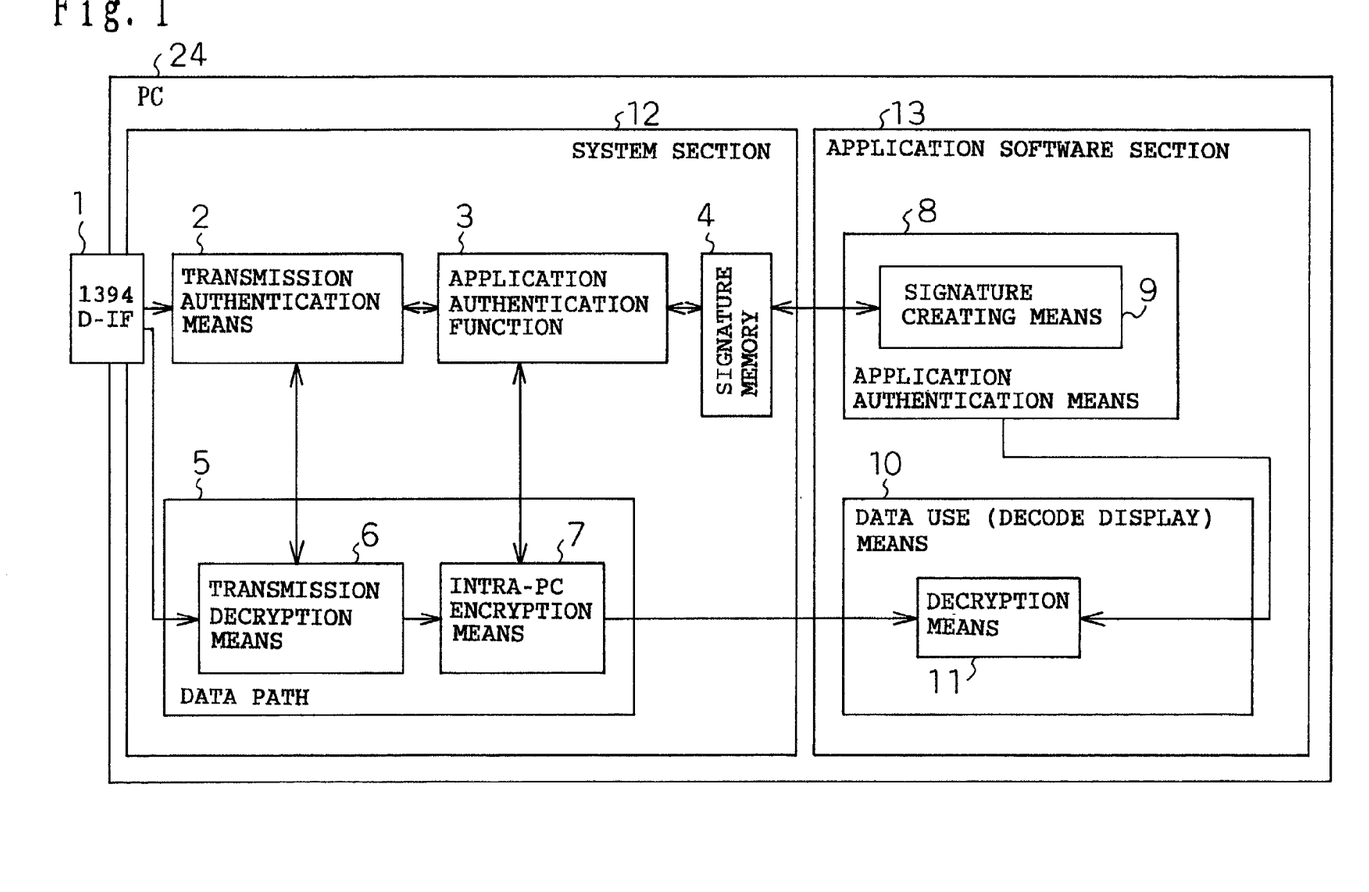
FIG. 1 is a block diagram showing a first embodiment of the present invention in which authentication is performed between a system section and an application software section and AV data is encrypted within a PC.
Figure 7:
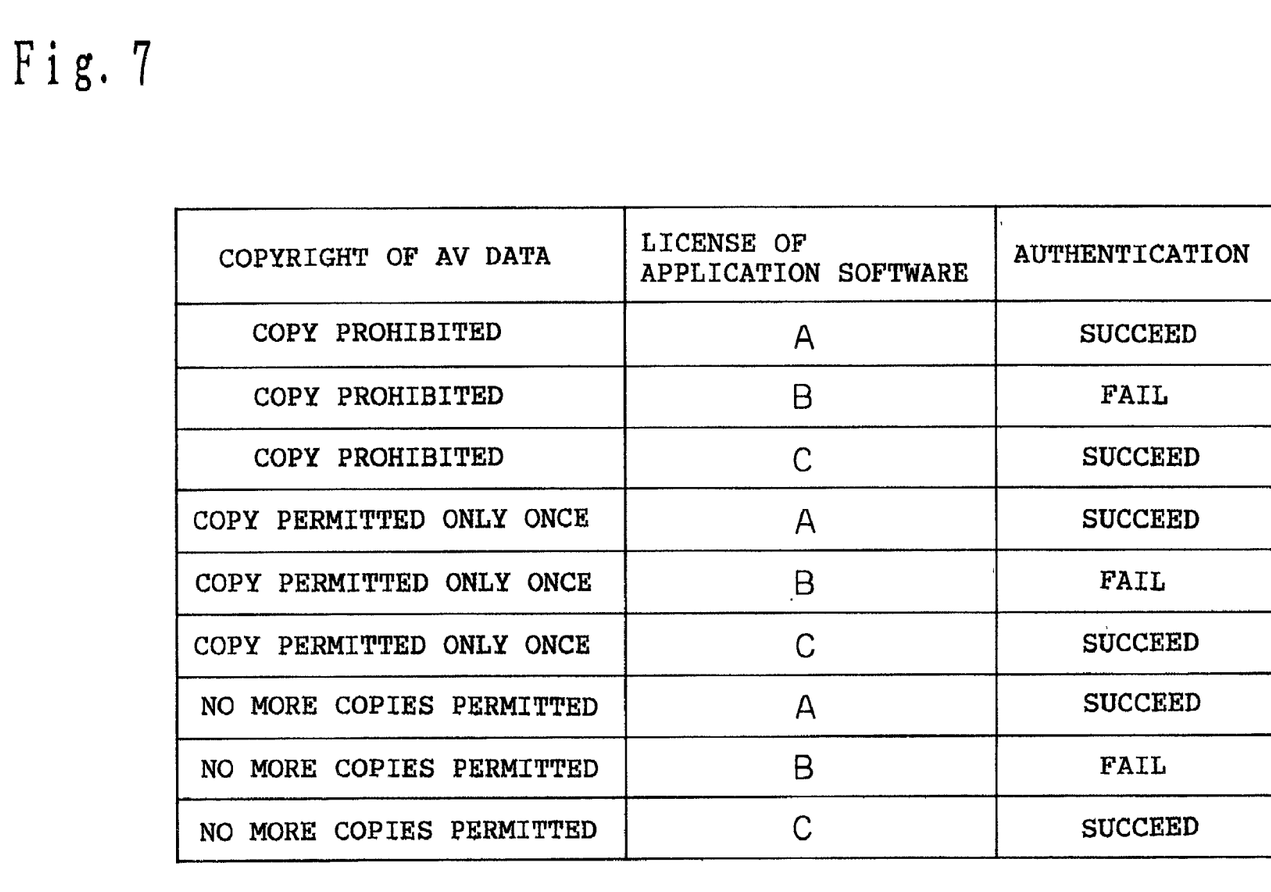
FIG. 7 is a list showing the authentication success/fail status versus the type of license appended to application software according to the first embodiment of the present invention.

A first embodiment will be described with reference to FIGS. 1 and 7. This embodiment deals with the case in which authentication is performed between a system section and an application software section and AV data input to a PC is transferred through the PC in encrypted form. In FIG. 1, the PC 24 comprises the system section 12 and the application software section 13. The system section 12 is D-IF hardware of the PC 24 or system software such as a driver or OS. The application software section 13 is a means for recording application software and executing the application software.

The system section 12 comprises a 1394 D-IF 1, a transmission authentication means 2, an application authentication function 3, a signature memory 4, a transmission decryption means 6, and an intra-PC encryption means 7.

The 1394 D-IF 1 is an IEEE 1394 interface, a serial bus interface standard, for transferring data and commands to and from an external device such as an STB or D-VHS. The transmission authentication means 2 is a means which, when AV data claims copyright protection, performs authentication with an external device and, when the authentication is completed successfully, passes a key for decrypting the AV data to the transmission decryption means 6. The application authentication function 3 is a means for performing authentication within the PC when the AV data input via the 1394 D-IF 1 claims copyright protection. More specifically, it performs authentication with the application software section 13 by referencing the contents of the signature memory 4 where the signature created by a signature creating means 9 is recorded and, when the authentication is completed successfully, passes an encryption key to the intra-PC encryption means 7 and a decryption key to an application authentication means 8. The signature memory 4 is a memory for recording the signature created by the signature creating means 9. The transmission decryption means 6 is a means which, when the authentication with the external device is completed successfully, receives the key from the transmission authentication means 2 and decrypts the AV data input via the 1394 D-IF 1. The intra-PC encryption means 7 is a means which, when the authentication with the application software section 13 is completed successfully, re-encrypts the AV data decrypted by the transmission decryption means 6 and passes the encrypted data to the application software section 13.

The application software section 13 comprises the application authentication means 8, the signature creating means 9, a data using (decoding and displaying) means 10, and a decryption means 11.

The application authentication means 8 is a means for performing authentication with the application authentication function in the system section 12. The signature creating means 9 is a means for creating a digital signature which is used when performing authentication with the system section 12. The data using (decoding and displaying) means 10 is a means for enabling currently running application software to use the AV data. The decryption means 11 is a means which, when the authentication with the system section 12 is completed successfully, receives a decryption key from the application authentication means 9 and decrypts, using the key, the AV data encrypted by the intra-PC encryption means 7.

Next, the operation of the present embodiment having the above configuration will be described.

First, a method of describing copyright information will be described.

When AV data is transferred from an external device such as an STB or VTR to the PC 24, that AV data may be one claiming copyright protection. That is, it may carry an appendage indicating that copying is prohibited or copying is permitted only once. Such signaling information indicating approval for use is implemented using the CGMS (Copy Generation information) embedded in a stream.

The CGMS is contained in a transport stream transmitted from a broadcasting station. The CGMS is 2-bit data; the values that the CGMS can take and their meanings are as follows.

That is, CGMS=11 means "copy never", CGMS=10 means "copy one generation", and CGMS=00 means "copy free". CGMS=01 does not exist. Here, "copy never" means that copying is prohibited and only playing back the AV data is permitted. "Copy one generation" means that copying is permitted only once and the copied AV data can be played back as many times as desired. "Copy free" means that the data can be copied freely. Detection of the CGMS requires the provision of a transport stream decoder circuit or the like and makes the hardware configuration complex.

The need for hardware such as the transport stream decoder circuit can be eliminated if signaling information (hereinafter referred to as EMI for Encryption Mode Indicator) for transmitting usage approval information is included in the IEEE 1394 packet data header.

The EMI is generated from the CGMS, and takes the following values. That is, EMI=11 means "copy never", EMI=10 means "copy one generation", and EMI=00 means "copy free". EMI=01 means "no more copy". Here, "copy never" means that copying is prohibited and only playing back the AV data is permitted. "Copy one generation" means that copying is permitted only once and the copied AV data can be played back as many times as desired. "Copy free" means that the data can be copied freely. "No more copy" means that the data is AV data already copied in compliance with "copy one generation", and therefore that no more copies are permitted.

In IEEE 1394, such EMI is used to specify the method of encryption and the method of authentication. For example, no encryption is performed when transmitting AV data with EMI=00 meaning "copy free". For data with EMI=10 meaning "copy one generation" or EMI=01 meaning "no more copy", the key used for encryption and the method of device authentication are different from those used for data with EMI=11 meaning "copy never".

Suppose here that AV data is received from an STB. Then, it is determined, based on the CGMS or the EMI, whether the AV data received from the STB is data claiming copyright protection; if it is copyright claimed data, authentication is performed with the STB, the sender of the AV data. The AV data is transmitted in encrypted form and, when the authentication is completed successfully, the transmission authentication means 2 receives a key for decrypting the AV data from the STB. When EMI is 11, authentication is performed based on a public key, while when EMI is 10 or 01, authentication is performed based on a common key.

When the authentication between the transmission authentication means and the STB is completed successfully, authentication between the application software section 13 and the system section 12 is performed next. In the application authentication means 8, the signature creating means 9 creates a digital signature for the currently running application software. The signature memory 4 records the digital signature created by the signature creating means 8. The application authentication function 3 performs the authentication with the application authentication means 8 by using the digital signature recorded in the signature memory 4.

Here, a license corresponding to the usage approval information of the copyright claimed AV data is appended in advance to each application software. The authentication between the application software section 13 and the system section 12 is completed successfully only when the software has a legitimate license. More specifically, the license is classified according to the function of application software. That is, the license given to software that has the function of only displaying AV data is classified as license A, and the license given to software that has the function of recording AV data is classified as license B. Further, the license given to software that strictly observes the copy protection status is classified as license C. The license C is given to such software that, when AV data is copy prohibited data, only plays back the AV data and does not copy it, and that, when AV data is data permitting copying only once, copies the AV data only once. However, the license C requires that the contents of the copyright of copyright claimed AV data be reported to the application software together with the AV data; this can be accomplished by building EMI or CGMS into the AV data.

Suppose here that the license class of the currently running application software is B. Also suppose that the usage approval information for the AV data transmitted from the STB indicates EMI=11. That is, copying of the AV data is prohibited. In this case, authentication between the application authentication means 8 and the application authentication function 3 is performed, but the authentication fails. Next, suppose that the license class of the currently running application software is A. In this case, since the application software is one that performs only display, authentication between the application authentication means 8 and the application authentication function 3 will be completed successfully.

Further, when copying of the AV data is prohibited, if the application software is one with the license C, the authentication will be completed successfully. FIG. 7 shows a list tabulating the relationships among the usage approval status of AV data, licence class of application software, and success/fail status of authentication.

When the authentication between the application software section 13 and the system section 12 is completed successfully, the transmission decryption means 6 receives the decryption key from the transmission authentication means 2 and decrypts the AV data received via the 1394 D-IF 1. Next, the intra-PC encryption means 7 re-encrypts the AV data. Within the PC 24, the copyright claimed AV data is transferred in encrypted form until it is presented for use by the application software. The decryption means 11 in the data using (decoding and displaying) means 10 receives the decryption key from the application authentication means 8 and decrypts the AV data. The decrypted AV data is passed from the data using (decoding and displaying) means 10 to the currently running application software for processing.

On the other hand, when the authentication between the application software section 13 and the system section 12 failed, the AV data is once decrypted by the transmission decryption means 6 and then encrypted again by the intra-PC encryption means 7, and the encrypted data is transferred to the data using (decoding and displaying) means 10. Since the authentication failed, the application authentication means 8 cannot receive the decryption key from the application authentication function 3; as a result, the decryption key cannot be passed to the decryption means 11 which is therefore unable to decrypt the AV data. In this way, if the application software does not have an appropriate license, it cannot decrypt the AV data for processing, since the authentication fails.

In this way, copyright claimed AV data is encrypted within the PC 24, and authentication is performed between the system section 12 and the application software section 13, to selectively identify application software that has the appropriate license; accordingly, if application software that does not have the appropriate license receives the AV data, since the data is encrypted, the application software cannot handle the AV data as valid data, and the copyright claimed AV data can thus be protected.

The re-encryption according to the present invention may be performed using the same key as that used to encrypt the data for transmission or a different key from that used to encrypt the data for transmission. Further, the AV data received in encrypted form may be transferred within the PC in the encrypted form without once decrypting it. It will also be noted that the method of re-encryption is not limited to the particular method described above, but any other specific method may be used.

Furthermore, in the present embodiment, the intra-PC encryption means has been described as transmitting the encrypted data to the data using (decoding and displaying) means when the authentication between the system section and the application software section failed, but instead, invalid data such as a blueback screen may be transmitted to the data using (decoding and displaying) means when the authentication failed. By so doing, the copyright of the AV data can be protected more securely.

The system section according to the present invention can be implemented using hardware constituting the 1394 D-IF or system software such as a driver or OS. That is, it may be implemented using hardware within the PC or using system software.

Moreover, the license according to the present embodiment is not limited to the one classified into three classes A, B, and C, as described above. It may be classified into four classes or two classes, the only requirement being that it be classified according to the status of the copyright information of AV data.

The present embodiment has been described by taking an STB as an example of the external device from which the PC receives copyright claimed AV data, but the invention is not limited to this particular example; that is, any other device, such as a DVC, DVHS, HDD, DVD-RAM, or broadcasting receiver may be used as the external device as long as it can transmit copyright claimed AV data.

Further, the present embodiment has been described by taking IEEE 1394 as an example, but the invention is not limited to this particular example, and any other network may be used as long as it has the function of transmitting copyright claimed AV data together with its copyright information.

It will also be noted that the AV data according to the present embodiment is not limited to video/audio data as described above, but should be interpreted to also include data such as copyright claimed programs or documents or any other data claiming copyright.

The PC described in the present embodiment is an example of the computer of the present invention.

Embodiment 2

Figure 2:
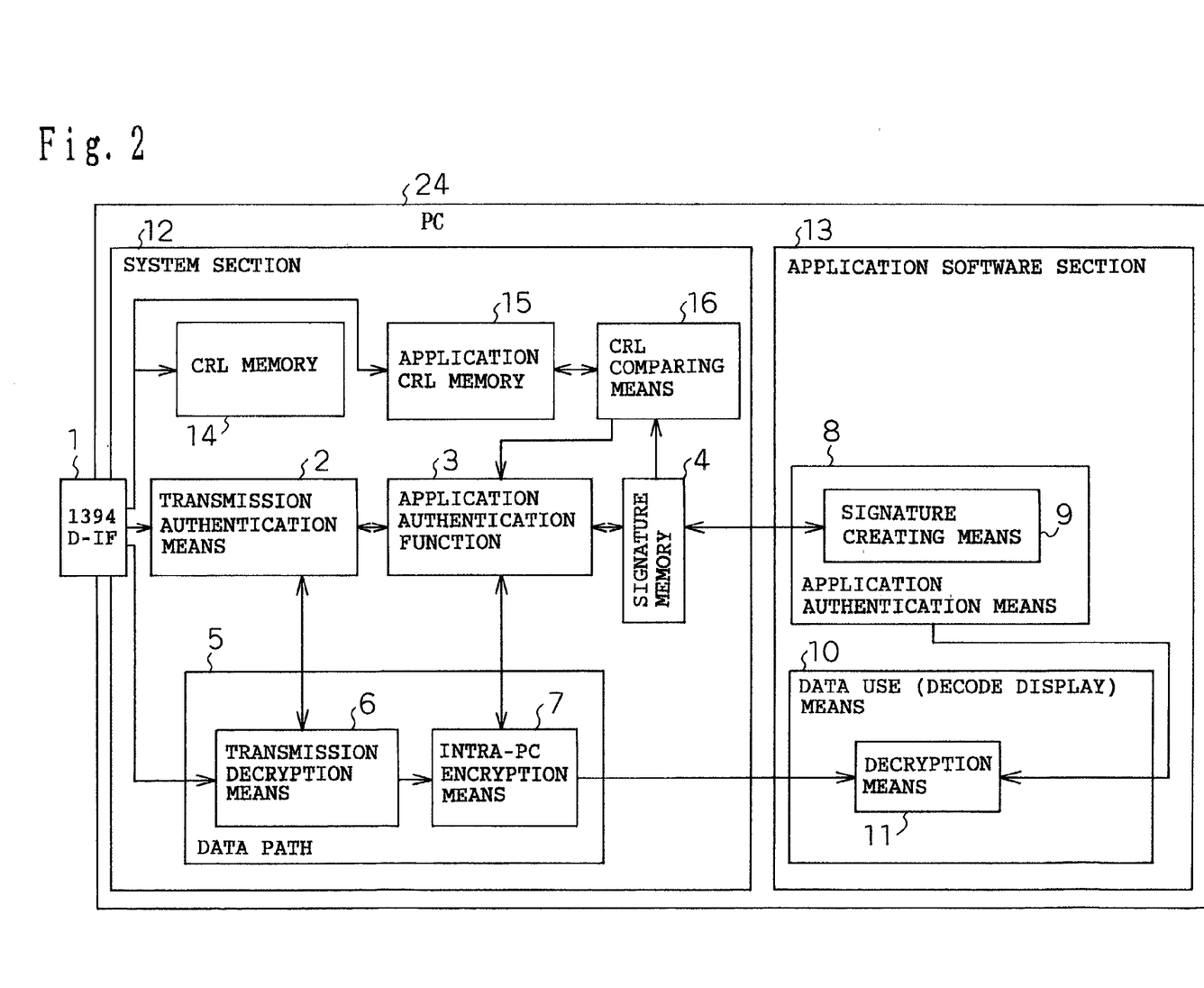
FIG. 2 is a diagram showing a second embodiment of the present invention in which illegal application software is detected using CRL.

Next, a second embodiment will be described with reference to FIG. 2.

The description of this embodiment deals with the case in which before performing authentication between the system section and the application software section, application software is discriminated using a management criterion (hereinafter called the CRL) discriminating illegitimate or legitimate application software.

The difference from the first embodiment is that the system section 12 includes a CRL memory 14, an application CRL memory 15, and a CRL comparing means 16. The following description is given focusing on the difference from the first embodiment.

The CRL memory 14 is a memory for storing the management criterion for discriminating an illegitimate or legitimate device. The application CRL memory 15 is a means for storing the management criterion for discriminating illegitimate or legitimate application software. The CRL comparing means 16 is a means for judging based on the CRL whether application software is illegitimate or legitimate.

Next, the operation of the present embodiment having the above configuration will be described.

In this embodiment also, it is assumed that AV data is sent from an STB, and that the AV data is data claiming copyright protection. First, before performing authentication between the transmission decryption means 6 and the STB, a judgement is made as to whether the PC 24 is a legitimate device or not by using the CRL stored in the CRL memory of the STB. If it is judged to be a legitimate device, the transmission authentication means 2 performs authentication with the STB. If it is judged to be an illegitimate device, the STB does not perform authentication and the key for decrypting the encrypted AV data is not passed to the PC 24.

Suppose here that the PC 24 is judged to be a legitimate device by the STB. Then, the transmission authentication means 2 performs authentication with the STB via the 1394 D-IF 1. When the authentication is completed successfully, the STB passes the key for decrypting the AV data to the transmission authentication means 2 via the 1394 D-IF 1.

Next, the signature creating means 9 creates a digital signature for the currently running application software, and the digital signature is stored in the signature memory 4. The CRL comparing means 16 judges whether the currently running application software is illegitimate software or legitimate software by comparing the contents of the digital signature stored in the signature memory 4 with the contents of the application CRL memory 15. If it is illegitimate software, authentication between the application software section 13 and the system section 12 is not performed. On the other hand, if it is legitimate software, authentication between the application software section 13 and the system section 12 is performed next. It is assumed here that a license similar to that described in the first embodiment is appended to the application software.

The application CRL memory 15 is a memory for the OS or driver residing in the PC 24; a separately created CRL may be prestored, or the CRL transferred from the IEEE 1394 may be used. Generally, the CRL is not fixed, but can be updated according to the situation. For example, if a device or application altered to infringe copyright is distributed, the CRL can be updated so as to cause authentication to fail by identifying such a device or application.

When the authentication is completed successfully between the application software section 13 and the system section 12, the transmission decryption means 6 receives the decryption key from the transmission authentication means 2, and decrypts the AV data received via the 1394 D-IF. Next, the intra-PC encryption means 7 re-encrypts the AV data. Within the PC 24, the copyright claimed AV data is transferred in encrypted form until it is presented for use by the application software. The decryption means 11 in the data using (decoding and displaying) means 10 receives the decryption key from the application authentication means 8 and decrypts the AV data. The decrypted AV data is passed from the data using (decoding and displaying) means 10 to the currently running application software for processing.

On the other hand, when the authentication between the application software section 13 and the system section 12 failed, the AV data is once decrypted by the transmission decryption means 6 and then encrypted again by the intra-PC encryption means 7, and the encrypted data is transferred to the data using (decoding and displaying) means 10. Since the authentication failed, the application authentication means 8 cannot pass the decryption key to the decryption means 11 which is therefore unable to decrypt the AV data. In this way, if the application software does not have an appropriate license, it cannot decrypt the AV data for processing, since the authentication fails.

Or, information on the version of a defeated and invalidated tamper resistant system is retrieved from the application CRL memory 15, and if the version of the application is that of the invalided tamper resistant system, then the key for decrypting the AV data is not passed to the application authentication function 3, nor is the authentication between the system section 12 and the application software section 13 performed.

In this way, by judging whether the currently running application software is illegitimate or legitimate by using the CRL before performing authentication between the application software section and the system section, the application software can be rejected in advance if it has the potential of performing illegal operations on the copyright claimed AV data.

The re-encryption according to the present invention may be performed using the same key as that used to encrypt the data for transmission or a different key from that used to encrypt the data for transmission. Further, the AV data received in encrypted form may be transferred within the PC in the encrypted form without once decrypting it. It will also be noted that the method of re-encryption is not limited to the particular method described above, but any other specific method may be used.

Furthermore, in the present embodiment, the intra-PC encryption means has been described as transmitting the encrypted data to the data using (decoding and displaying) means when the authentication between the system section and the application software section failed, but instead, invalid data such as a blueback screen may be transmitted to the data using (decoding and displaying) means when the authentication failed. By so doing, the copyright of the AV data can be protected more securely.

The system section according to the present invention can be implemented using hardware constituting the 1394 D-IF or system software such as a driver or OS. That is, it may be implemented using hardware within the PC or using system software.

The present embodiment has been described by taking an STB as an example of the external device from which the PC receives copyright claimed AV data, but the invention is not limited to this particular example; that is, any other device, such as a DVC, DVHS, HDD, DVD-RAM, or broadcasting receiver may be used as the external device as long as it can transmit copyright claimed AV data.

Further, the present embodiment has been described by taking IEEE 1394 as an example, but the invention is not limited to this particular example, and any other network may be used as long as it has the function of transmitting copyright claimed AV data together with its copyright information.

It will also be noted that the AV data according to the present embodiment is not limited to video/audio data as described above, but should be interpreted to also include data such as copyright claimed programs or documents or any other data claiming copyright.

The PC described in the present embodiment is an example of the computer of the present invention.

Embodiment 3

Figure 3:
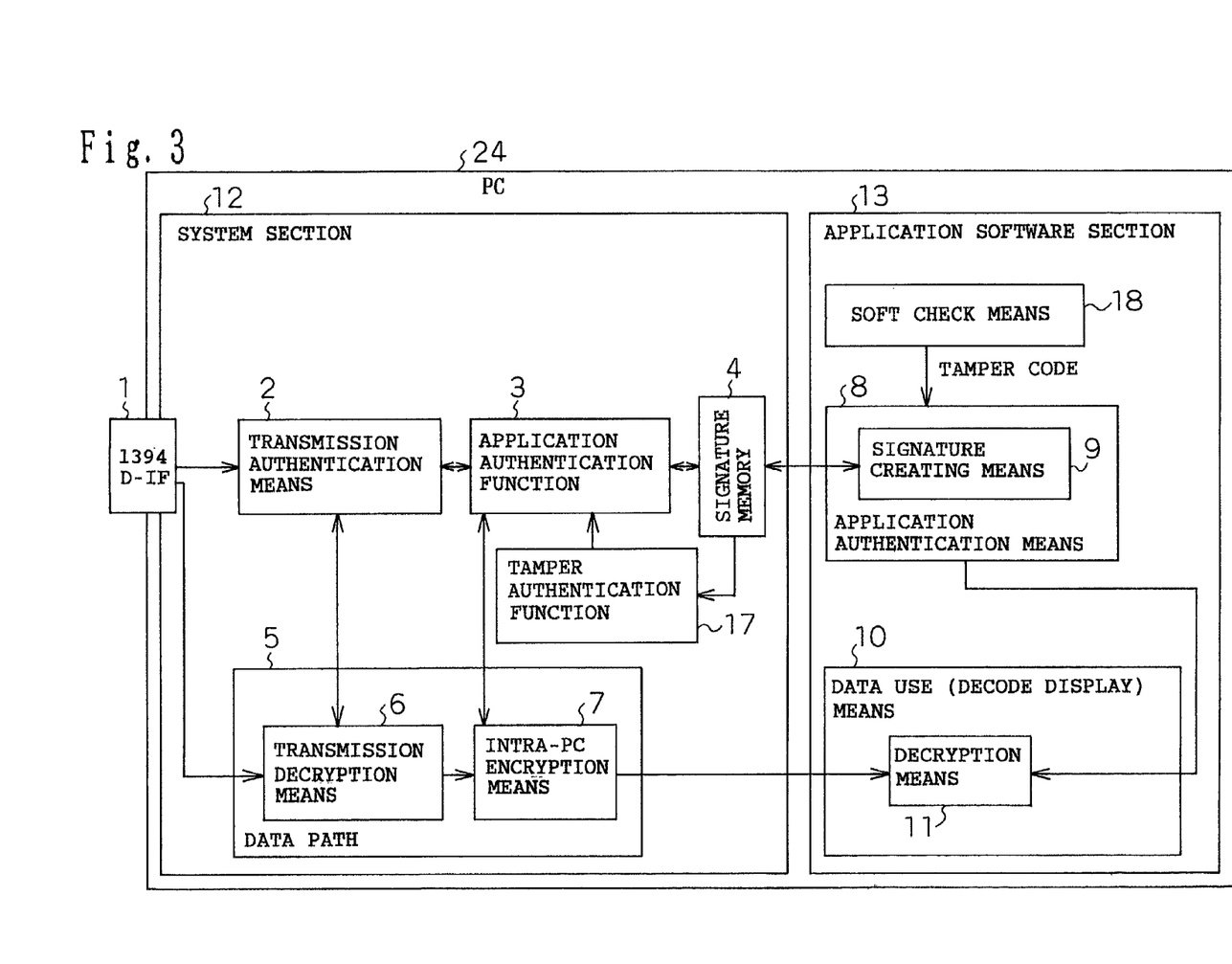
FIG. 3 is a diagram showing a third embodiment of the present invention in which a tamper resistant system is incorporated.

Next, a third embodiment will be described with reference to FIG. 3.

The description of this embodiment deals with the case in which using a tamper authentication function, a judgement is made as to whether application software is illegally altered or not.

The difference from the first embodiment is that the system section 12 includes the tamper authentication function 17 and the application software section 13 includes a soft check means 18.

The tamper authentication function 17 is a means for verifying a tamper code generated from application software to determine whether or not the application software has been tampered with. The soft check means 18 is a means for checking the currently running application and generating the tamper code.

Next, the operation of the present embodiment having the above configuration will be described.

Tamper resistant software that generates a tamper code, as described above, refers to software having resistance to internal analysis or alterations. That is, it refers to software that can protect against an offence from an ill-willed user attempting to illegally use copyright claimed AV data. Tamper resistant software generates a code called a tamper code. The soft check means 18 examines the program to verify the presence or absence of tampering, and also examines the execution environment to verify the presence or absence of interception along the data path, the presence of a third party monitoring the execution of the program, etc. The tamper code is data representing the result of this verification or an intermediate result. By verifying this tamper code, it can be determined whether or not the tamper resistant software has been tampered with. That is, in the present embodiment, the application software is equipped with a built-in tamper resistant system.

Here, as in the first embodiment, suppose that authentication is performed between the STB and the transmission authentication means 2, and that the authentication is completed successfully. Then, the soft check means 18 checks the currently running application software and generates a tamper code. The generated tamper code is passed to the application authentication means where the tamper code is written into the digital signature by the signature creating means 9; then, this digital signature is stored in the signature memory 4. By referencing the digital signature stored in the signature memory 4, the tamper authentication function 17 retrieves the tamper code of the currently running application software and verifies it. The result of the verification as to whether the currently running application software is illegally altered or not, or whether data interception or the monitoring of the program execution is being performed or not, is reported to the application authentication function 3. For simplicity, the following description is given by assuming that the verification as to whether data interception or the monitoring of the program execution is being performed or not is included in the verification as to whether the application is illegally altered or not. If the application software is illegally altered, the application authentication function 3 does not pass the key for decrypting the AV data to the application authentication means 8, nor does it perform authentication between the system section 12 and the application software section 13. If the application software is not altered illegally, the application authentication function 3 and the application authentication means 8 perform authentication based on the digital signature recorded in the signature memory 4. Here, as in the first embodiment, a license is appended to the application software. When the authentication is completed successfully, the application authentication function 3 passes the key for decrypting the AV data to the application authentication means 8.

When the authentication is completed successfully between the application software section 13 and the system section 12, the transmission decryption means 6 receives the decryption key from the transmission authentication means 2, and decrypts the AV data received via the 1394 D-IF 1. Next, the intra-PC encryption means 7 re-encrypts the AV data. Within the PC 24, the copyright claimed AV data is transferred in encrypted form until it is presented for use by the application software. The decryption means 11 constituting the data using (decoding and displaying) means 10 receives the decryption key from the application authentication means 8 and decrypts the AV data. The decrypted AV data is passed from the data using (decoding and displaying) means 10 to the currently running application software for processing.

On the other hand, when the authentication between the application software section 13 and the system section 12 failed, the AV data is once decrypted by the transmission decryption means 6 and then encrypted again by the intra-PC encryption means 7, and the encrypted data is transferred to the data using (decoding and displaying) means 10. Since the authentication failed, the application authentication means 8 cannot pass the decryption key to the decryption means 11 which is therefore unable to decrypt the AV data. In this way, if the application software does not have an appropriate license, it cannot process the AV data, since the authentication fails.

In this way, by incorporating a tamper resistant system into the application software and by adding a function for checking the application software for illegally tampering, the copyright of the AV data can be protected more securely.

The re-encryption according to the present invention may be performed using the same key as that used to encrypt the data for transmission or a different key from that used to encrypt the data for transmission. Further, the AV data transferred in encrypted form may be transferred within the PC in the encrypted form without once decrypting it. It will also be noted that the method of re-encryption is not limited to the particular method described above, but any other specific method may be used.

Furthermore, in the present embodiment, the intra-PC encryption means has been described as transmitting the encrypted data to the data using (decoding and displaying) means when the authentication between the system section and the application software section failed, but instead, the intra-PC encription means which transmits invalid data such as a blueback screen to the data using (decoding and displaying) means when the authentication failed, may be used. By so doing, the copyright of the AV data can be protected more securely.

The system section according to the present invention can be implemented using hardware constituting the 1394 D-IF or system software such as a driver or OS. That is, it may be implemented using hardware within the PC or using system software.

The present embodiment has been described by taking an STB as an example of the external device from which the PC receives copyright claimed AV data, but the invention is not limited to this particular example; that is, any other device, such as a DVC, DVHS, HDD, DVD-RAM, or broadcasting receiver may be used as the external device as long as it can transmit copyright claimed AV data.

Further, the present embodiment has been described by taking IEEE 1394 as an example, but the invention is not limited to this particular example, and any other network may be used as long as it has the function of transmitting copyright claimed AV data together with its copyright information.

It will also be noted that the AV data according to the present embodiment is not limited to video/audio data as described above, but should be interpreted to also include data such as copyright claimed programs or documents or any other data claiming copyright.

Furthermore, the tamper code and the tamper resistance verification function according to the present invention are not restricted to using the particular tamper resistant system, but can be implemented using any desired tamper resistant system.

The PC described in the present embodiment is an example of the computer of the present invention, and the tamper authentication function according to the present embodiment is an example of the tamper resistance verification function of the present invention.

Embodiment 4

Figure 4:
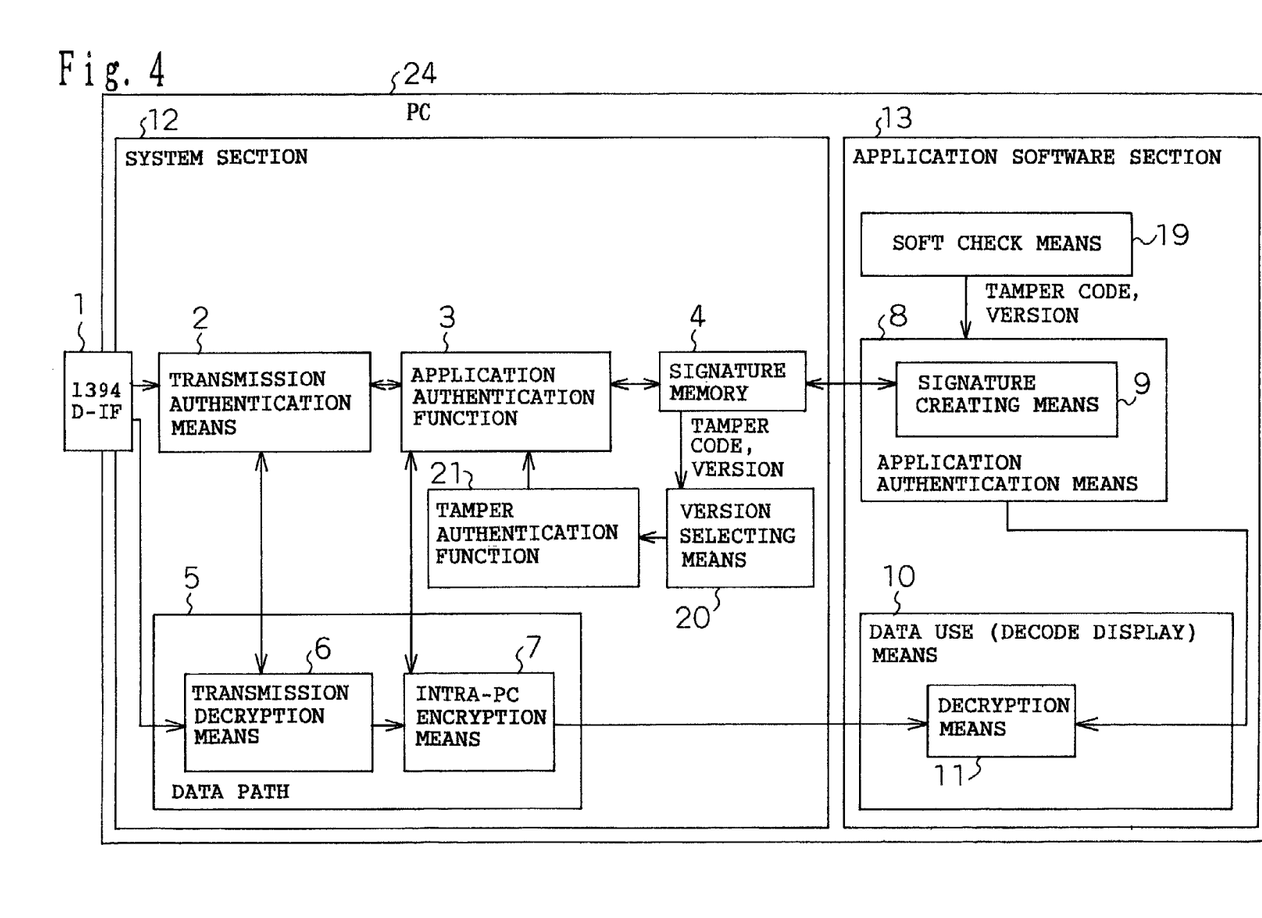
FIG. 4 is a diagram showing a fourth embodiment of the present invention in which a plurality of tamper verification functions are incorporated.

Next, a fourth embodiment will be described with reference to FIG. 4.

The description of this embodiment deals with the case in which using a tamper authentication function, a judgement is made as to whether application software is illegally altered or not.

The difference from the third embodiment is that the system section 12 includes a plurality of tamper authentication functions 21 and a version selecting means 20, and the soft check means 19 in the application software section 13 generates not only a tamper code but also type information indicating the type of the tamper resistant system built into the application software.

The version selecting means 20 is a means for selecting the tamper authentication function corresponding to the type of the tamper resistant system, based on the digital signature recorded in the signature memory 4.

Next, the operation of the present embodiment having the above configuration will be described.

It is assumed here that, as in the third embodiment, the application software is equipped with a built-in tamper resistant system. Suppose, as in the third embodiment, that authentication is performed between the STB and the transmission authentication means 2, and that the authentication is completed successfully. Then, the soft check means 19 checks the currently running application software and generates a tamper code and type information indicating the type of the built-in tamper resistant system. The thus generated tamper code and type information are passed to the application authentication means 8 where the tamper code and type information are written into the digital signature by the signature creating means 9; then, this digital signature is stored in the signature memory 4. The version selecting means 20 selects the tamper authentication function to be used, by referencing the tamper resistant system type information stored in the signature memory 4. Here, it is assumed that the version selecting means 20 includes its own CRL memory for tamper versions, though not shown here, and by utilizing this CRL memory, the version selecting means 20 operates so as not to select tamper resistance check means 19 for which the method of defeating it is already known. The selected tamper authentication function 21, by referencing the digital signature stored in the signature memory 4, retrieves the tamper code of the currently running application software and verifies it. The result of the verification as to whether the currently running application software is illegally altered or not is reported to the application authentication function 3. If the application software is illegally altered, the application authentication function 3 does not pass the key for decrypting the AV data to the application authentication means 8, nor does it perform authentication between the system section 12 and the application software section 13. If the application software is not altered illegally, the application authentication function 3 and the application authentication means 8 perform authentication based on the digital signature recorded in the signature memory 4. Here, as in the first embodiment, a license is appended to the application software. When the authentication is completed successfully, the application authentication function 3 passes the key for decrypting the AV data to the application authentication means 8.

When the authentication is completed successfully between the application software section 13 and the system section 12, the transmission decryption means 6 receives the decryption key from the transmission authentication means 2, and decrypts the AV data received via the 1394 D-IF 1. Next, the intra-PC encryption means 7 re-encrypts the AV data. Within the PC 24, the copyright claimed AV data is transferred in encrypted form until it is presented for use by the application software. The decryption means 11 in the data using (decoding and displaying) means 10 receives the decryption key from the application authentication means 8 and decrypts the AV data. The decrypted AV data is passed from the data using (decoding and displaying) means 10 to the currently running application software for processing.

On the other hand, when the authentication between the application software section 13 and the system section 12 failed, the AV data is once decrypted by the transmission decryption means 6 and then encrypted again by the intra-PC encryption means 7, and the encrypted data is transferred to the data using (decoding and displaying) means 10. Since the authentication failed, the application authentication means 8 cannot pass the decryption key to the decryption means 11 which is therefore unable to decrypt the AV data. In this way, if the application software does not have an appropriate license, it cannot decrypt the AV data for processing, since the authentication fails.

In this way, by not only incorporating a tamper resistant system into the application software but also providing a plurality of tamper resistant authentication functions in the system section, if the tamper resistant system of the application software is defeated, the system section need only switch to another kind of tamper resistant authentication function, eliminating the need for updating the version of the OS, etc., and the damage can thus be minimized if the tamper resistant system is defeated.

The re-encryption according to the present invention may be performed using the same key as that used to encrypt the data for transmission or a different key from that used to encrypt the data for transmission. Further, the AV data received in encrypted form may be transferred within the PC in the encrypted form without once decrypting it. It will also be noted that the method of re-encryption is not limited to the particular method described above, but any other specific method may be used.

Furthermore, in the present embodiment, the intra-PC encryption means has been described as transmitting the encrypted data to the data using (decoding and displaying) means when the authentication between the system section and the application software section failed, but instead, invalid data such as a blueback screen may be transmitted to the data using (decoding and displaying) means when the authentication failed. By so doing, the copyright of the AV data can be protected more securely.

The system section according to the present invention can be implemented using hardware constituting the 1394 D-IF or system software such as a driver or OS. That is, it may be implemented using hardware within the PC or using system software.

The present embodiment has been described by taking an STB as an example of the external device from which the PC receives copyright claimed AV data, but the invention is not limited to this particular example; that is, any other device, such as a DVC, DVHS, HDD, or DVD-RAM, may be used as the external device as long as it can transmit copyright claimed AV data.

Further, the present embodiment has been described by taking IEEE 1394 as an example, but the invention is not limited to this particular example, and any other network may be used as long as it has the function of transmitting copyright claimed AV data together with its copyright information.

It will also be noted that the AV data according to the present embodiment is not limited to video/audio data as described above, but should be interpreted to also include data such as copyright claimed programs or documents or any other data claiming copyright.

Furthermore, the tamper code and the tamper resistance verification function according to the present invention are not restricted to using the particular tamper resistant system described above, but can be implemented using any desired tamper resistant system.

The PC described in the present embodiment is an example of the computer of the present invention, and the tamper authentication function according to the present embodiment is an example of the tamper resistance verification function of the present invention.

Embodiment 5

Figure 5:
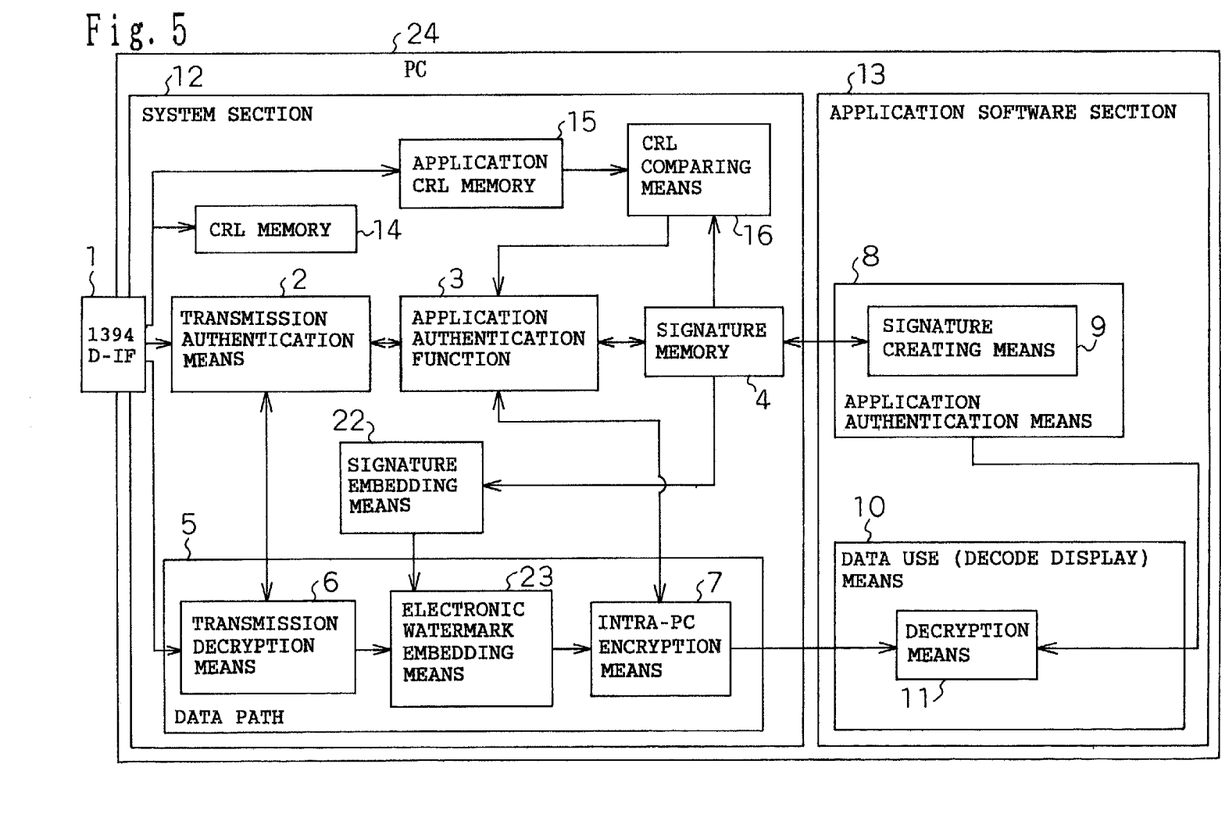
FIG. 5 is a diagram showing a fifth embodiment of the present invention in which an electronic watermark is embedded into copyright claimed AV data.

Next, a fifth embodiment will be described with reference to FIG. 5.

The description of this embodiment deals with the case in which information concerning the application software used to process AV data is embedded in the AV data by means of electronic watermarking.

The electronic watermarking here refers to a technique for inserting a signature or like data into AV data in a difficult-to-alter manner, regardless of whether the technique is based on analog data superimposition or on digital cryptography.

The difference from the first and second embodiments is that the system section includes a signature embedding means 22 and an electronic watermark embedding means 23.

The signature embedding means 22 refers to the contents of the digital signature recorded in the signature memory 4, and performs processing, such as selecting information necessary for the electronic watermark embedding means 23 and preparing necessary format, preparatory to processing in the electronic watermark embedding means 23. The electronic watermark embedding means 23 embeds data by electronic watermarking in the format prepared by the signature embedding means 22.

In the present embodiment, the transmission authentication means 2, the application authentication function 3, the signature memory 4, the application authentication means 8, the signature creating means 9, the transmission decryption means 6, the intra-PC encryption means 7, the data using (decoding and displaying) means 10, and the decryption means 11 are the same as the corresponding elements in the first embodiment. The CRL memory 14, the application CRL memory 15, and the CRL comparing means 16 are the same as the corresponding elements in the second embodiment.

Next, the operation of the present embodiment having the above configuration will be described.

Suppose that authentication is performed between an external device, for example, an STB, and the transmission authentication means 2 and is completed successfully. Also suppose that authentication between the application authentication means 8 and the application authentication function 3 is completed successfully. Then, the encrypted AV data input via the 1394 D-IF 1 is decrypted by the transmission decryption means 6. The signature embedding means 22 retrieves the digital signature containing application software information from the signature memory 4, and selects the contents. The selected contents include the name of the application software, the version number of the application software, information concerning the user, and information concerning the AV data itself. The signature embedding means 22 applies preparatory processing, such as preparing the format, to these pieces of information and sends the processed information to the electronic watermark embedding means 23. The electronic watermark embedding means 23 produces an electronic watermark by incorporating these pieces of information into the decrypted AV data. The AV data with the thus produced electronic watermark incorporated therein is encrypted once again by the intra-PC encryption means 7, and the encrypted AV data is passed to the data using (decoding and displaying) means 10. The decryption means 11 decrypts the AV data, and the data using (decoding and displaying) means 10 passes it to the currently running application software. The application software that received the AV data performs processing such as display, recording, playback, etc.

Suppose here that the application software illegally recorded the electronically watermarked AV data and distributed it outside the PC 24. Also suppose that the CGMS or EMI contained in the illegally distributed AV data was altered by an illegitimate application. The AV data thus altered is now recordable even on a legitimate device, and is distributed to many devices. If a supervising organization checking illegal distribution of AV data obtains the AV data, the organization can retrieve the following information by referencing the electronic watermark embedded in the AV data. That is, from the information concerning the AV data, it is found that the AV data is copy prohibited data, etc., and from the information concerning the application software, the source application software used to illegally copy and distribute the AV data can be identified.

In this way, according to the present invention, the source of the illegal distribution can be identified; besides, since the computer of the present invention is equipped with means for updating the CRL, the application responsible for the illegal distribution can be excluded from the use of AV data by updating the CRL based on the information concerning the source, thus providing specific means for preventing illegal use thereafter. By using the electronic watermark in this way, the source of the illegal copy can be identified, and thus the illegal application software can be easily isolated.

The electronic watermarking system is not limited to the one used in the present embodiment, but any other system may be used as long as it can correctly embed the above-mentioned information into AV data and can correctly extract the information from the AV data before or after decoding in the prescribed format.

In this way, by embedding an electronic watermark into AV data, illegal application software can be easily isolated and rejected.

Embodiment 6

Figure 6:
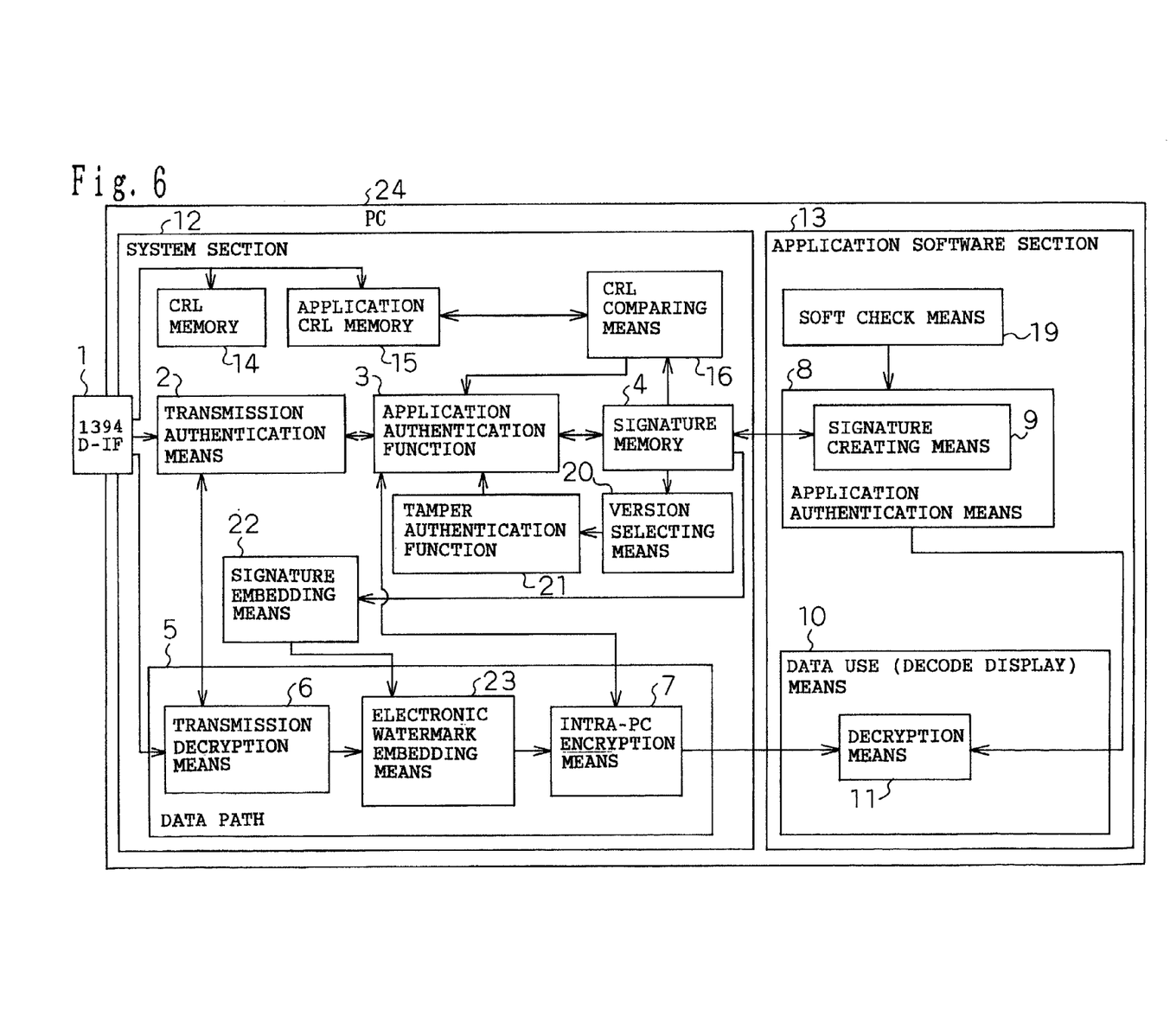
FIG. 6 is a diagram showing a sixth embodiment of the present invention in which the copyright of copyright claimed AV data can be protected more securely.

Next, a sixth embodiment will be described with reference to FIG. 6.

The PC of the present embodiment combines all the functions of the PCs described in the first to fifth embodiments.

The transmission authentication means 2, the application authentication function 3, the signature memory 4, the application authentication means 8, the signature creating means 9, the transmission decryption means 6, the intra-PC encryption means 7, the data using (decoding and displaying) means 10, and the decryption means 11 are the same as the corresponding elements described in the first embodiment. The CRL memory 14, the application CRL memory 15, and the CRL comparing means 16 are the same as the corresponding elements described in the second embodiment. The version selecting means 20 and the tamper authentication means 21 are the same as the corresponding elements described in the fourth embodiment. The signature embedding means 22 and the electronic watermark embedding means 23 are the same as the corresponding elements described in the fifth embodiment.

The above configuration incorporates all the functions described in the first to fifth embodiments, and is therefore equipped with means for checking software reliability based on a tamper resistant system, a reliable detection method for detecting illegal use based on electronic watermarking, and means for preventing recurrence of illegal use once it is detected; accordingly, illegal use of copyright claimed AV data can be prevented in a reliable manner and, by introducing the concept of version into the tamper resistant system, collateral damage resulting from illegal use can be minimized.

The invention may also be embodied in the form of a program recording medium having a program and/or data recorded thereon for enabling a computer to implement all or part of the functions of all or part of the invention described in any one of the above-described embodiments, wherein the program and/or data is computer readable and the program and/or data read by the computer is used to carry out the above functions in collaboration with the computer.

The term "data" here includes data structure, data format, and data type.

The term "medium" refers to a recording medium such as a ROM, a transmission medium such as the Internet, or a transmission medium such as light, electric waves, sound waves, etc.

The term "medium holding thereon" means, for example, a recording medium having a program and/or data recorded thereon, or a transmission medium or the like for transmitting the program and/or data.

The term "computer processable" means that in the case of a recording medium such as a ROM, for example, the medium is readable by a computer, and in the case of a transmission medium, the program and/or data to be transmitted can be processed by a computer as the result of the transmission.

Further, the term "collection of information" includes, for example, software such as a program and/or data.

POTENTIAL FOR EXPLOITATION IN INDUSTRY

As is apparent from the above description, the present invention can provide a computer and a program recording medium which ensure that application software protects copyright for copyright claimed data, and which can address illegal alterations of the application software, identify and reject illegal application software, and prevent illegal distribution without involving extra cost.

What is claimed is:

1. A computer which comprises a system section and an application software section, and which takes in copyright claimed, encrypted data via a digital interface for processing therein, wherein said system section includes a plurality of tamper verification functions, and a tamper code associated with a designated type of tamper verification function and type information indicating said type are embedded into said application software in said application software section, and wherein said system section reads said tamper code and its associated type information from said application software section and, using the tamper verification function corresponding to said type, verifies whether or not said application software has been tampered with, and if it is found that said application software has been tampered with, said system section reports the result of said verification.

2. In a computer having an operating system and an application program, in which the application program performs a task of providing data to a user, a method of protecting copyrighted received data, comprising the steps of:

(a) receiving by the operating system copyrighted data;
(b) authenticating by the operating system the application program;

(c) encrypting by the operating system the copyrighted data received in step (a);

(d) providing a decryption key from the operating system to the application program, if the application program is authenticated in step (b);

(e) transmitting the encrypted data of step (c) from the operating system to the application program; and (f) decrypting the encrypted data in the application program using the key provided in step (d); and step (b) further includes determining a license classification of the application program, in which the classification is one of (i) display-only permitted and (ii) recording permitted.

3. The method of claim 2 in which step (c) includes decrypting the data received in step (a) using another key before encrypting the data in step (c).

4. The method of claim 2 in which step (b) includes
i) generating a digital signature in the application program;
ii) sending the digital signature from the application program to the operating system and storing the signature in the operating system; and
iii) authenticating the application program using the signature stored in step (ii).

5. The method of claim 2 in which step (a) includes receiving at least one of copyrighted audio data and copyrighted video data.

6. The method of claim 2 in which the operating system controls allocation and usage of resources of the computer.

7. In a computer having an operating system and an application program, and receiving copyrighted data via a digital interface for processing,
a method of protecting the received data comprising the steps of:
(a) providing a plurality of tamper verification functions to the operating system;
(b) providing a tamper code, associated with a designated type of tamper verification function, to the application program;
(c) receiving, by the operating system, copyrighted data;
(d) reading, by the operating system, the tamper code and its associated type information from the application program;
(e) using, by the operating system, the tamper code and associated type information with a corresponding tamper verification function to verify whether or not the application program has been tampered with, and if it is found that the application program has been tampered with, the operating system reports the results of the verification,
(f) determining a license classification of the application program, in which the classification is one of: (i) display-only permitted, and (ii) recording permitted;
(g) encrypting, by the operating system, the received copyrighted data;
(h) if the operating system verifies that the application program (i) has not been tampered with, and (ii) has a proper license classification, then providing, by the operating system, the encrypted data and a decryption key to the application program; and
(i) decrypting the encrypted data in the application program using the decryption key from the operating system.

8. A computer having a system section and an application software section, and which takes in copyright claimed, encrypted data via a digital interface for processing therein, wherein said system section judges that said application software section is legitimate application software for the protection of copyright, if said application software is a legitimate one, said system section passes a key for said encrypted data to said application software section, said judgment in said system section is made by using a CRL (Certification Revocation List) listing illegitimate or legitimate application software, and listing at least tamper type information, said system section includes a plurality of tamper verification functions, and a tamper code associated with a designated type of tamper verification function and type information indicating said type are embedded into said application software in said application software section, and said system section reads said tamper code and its associated type information from said application software section and, using the tamper verification function corresponding to said type, verifies whether or not said application software has been tampered with, and if it is found that said application software has been tampered with, said system section reports the result of said verification.

9. In a computer having a system section and an application software section, and which takes in copyright claimed, encrypted data via a digital interface for processing therein, a method comprising the steps of:

judging, by said system section, that said application software section is a legitimate application software for the protection of copyright, if said application software is a legitimate one, passing, by said system section, a key for said encrypted data to said application software section, wherein said judgment in said system section is made by using a CRL (Certification Revocation List) listing illegitimate or legitimate application software, and listing at least tamper type information, said system section includes a plurality of tamper verification functions, and a tamper code associated with a designated type of tamper verification function and type information indicating said type are embedded into said application software in said application software section, and reading, by said system section, said tamper code and its associated type information from said application software section, and using the tamper verification function corresponding to said type, verifying whether or not said application software has been tampered with, and if it is found that said application software has been tampered with, reporting, by said system section, the result of said verification.

10. A computer having a system section and an application software section, and which takes in copyright claimed, encrypted data via a digital interface for processing therein, wherein said system section judges that said application software section is legitimate application software for the protection of copyright, if said application software is a legitimate one, said system section passes a key for said encrypted data to said application software section, said judgment in said system section is made by using a CRL (Certification Revocation List) listing illegitimate or legitimate application software, and listing at least tamper type information, said system section includes a plurality of tamper verification functions, and a tamper code associated with a designated type of tamper verification function and type information indicating said type are embedded into said application software in said application software section, and said system section reads said tamper code and its associated type information from said application software section and, using the tamper verification function corresponding to said type, verifies whether or not said application software has been tampered with, and if it is found that said application software has been tampered with, said system section reports the result of said verification, said system section is configured to send said data to said application section by embedding into said data information concerning application software residing in said application software section, wherein the information concerning said application software is information indicating the name of said application software, or the version number of said application software, or a tamper code, or the type of a tamper resistance verification function, or information concerning a user.

11. In a computer having a system section and an application software section, and which takes in copyright claimed, encrypted data via a digital interface for processing therein, a method comprising the steps of:

judging, by said system section, that said application software section is a legitimate application software for the protection of copyright, if said application software is a legitimate one, passing, by said system section, a key for said encrypted data to said application software section, wherein said judgment in said system section is made by using a CRL (Certification Revocation List) listing illegitimate or legitimate application software, and listing at least tamper type information, said system section includes a plurality of tamper verification functions, and a tamper code associated with a designated type of tamper verification function and type information indicating said type are embedded into said application software in said application software section, and reading, by said system section, said tamper code and its associated type information from said application software section, and using the tamper verification function corresponding to said type, verifying whether or not said application software has been tampered with, and if it is found that said application software has been tampered with, reporting, by said system section, the result of said verification, wherein said system section sends said data to said application section by embedding into said data information concerning application software residing in said application software section, and the information concerning said application software is information indicating the name of said application software, or the version number of said application software, or a tamper code, or the type of a tamper resistance verification function, or information concerning a user.

12. A storage medium holding thereon a program and/or data for enabling a computer to implement all or part of the functions of all or part of the means of the invention described in any one of the claims 1, 7–10, or 11, wherein said storage medium is computer processable.

13. A collection of information stored on a computer or a computer readable storage medium, wherein said collection of information is a program and/or data for enabling a computer to implement all or part of the functions of all or part of the means of the invention described in any one of the claims 1, 7–10, or 11.

* * * * *